United States Patent [19]
Goins, Jr. et al.

[11] Patent Number: 5,760,161
[45] Date of Patent: Jun. 2, 1998

[54] PROCESS FOR MAKING UNSATURATED, THERMOSETTING, BROMINATED PHTHALIC ANHYDRIDE/POLYOL POLYESTER RESINS

[75] Inventors: Otto K. Goins, Jr.; Todd M. Cooke; David R. Brackenridge, all of Baton Rouge, La.

[73] Assignee: Albemarle Corporation, Richmond, Va.

[21] Appl. No.: 797,073

[22] Filed: Feb. 10, 1997

[51] Int. Cl.$^6$ .................. C08G 63/68; C08K 5/09
[52] U.S. Cl. .................. 528/299; 528/274; 528/275; 528/283; 528/285; 528/302; 528/306; 524/777; 524/783; 524/845
[58] Field of Search .................. 528/274, 275, 528/283, 285, 299, 302, 306; 524/777, 783, 745

[56] References Cited

U.S. PATENT DOCUMENTS

| | | | |
|---|---|---|---|
| Re. 30,554 | 3/1981 | Weinberg et al. | 260/429 R |
| 1,108,329 | 8/1914 | Callahan | 528/308 |
| 1,864,909 | 6/1932 | Jaeger | 528/299 |
| 1,884,289 | 10/1932 | Schuhmann et al. | 528/308 |
| 1,950,468 | 3/1934 | Zwilgmeyer | 260/8 |
| 2,087,852 | 7/1937 | Ellis | 260/8 |
| 2,455,873 | 12/1948 | Nordlander et al. | 260/22 |
| 2,621,168 | 12/1952 | Ross et al. | 260/75 |
| 3,055,867 | 9/1962 | Le Bras et al. | 260/75 |
| 3,056,817 | 10/1962 | Werber et al. | 260/404.8 |
| 3,056,818 | 10/1962 | Werber | 260/410.6 |
| 3,057,908 | 10/1962 | Gruschke et al. | 260/475 |
| 3,285,995 | 11/1966 | Nametz et al. | 260/865 |
| 3,419,518 | 12/1968 | Mahling et al. | 260/41 |
| 3,738,958 | 6/1973 | Paul | 260/45.75 B |
| 3,874,155 | 4/1975 | Knopka | 57/140 BY |
| 3,883,481 | 5/1975 | Kopetz et al. | 260/45.75 B |
| 4,024,102 | 5/1977 | Stackman et al. | 260/40 R |
| 4,098,704 | 7/1978 | Sandler | 252/8.6 |
| 4,101,528 | 7/1978 | Knopka | 260/45.75 R |
| 4,132,748 | 1/1979 | Arthur et al. | 260/873 |
| 4,156,072 | 5/1979 | Weinberg et al. | 528/279 |
| 4,205,157 | 5/1980 | Duh | 528/272 |
| 4,223,124 | 9/1980 | Broughton et al. | 528/272 |
| 4,260,735 | 4/1981 | Bander et al. | 528/279 |
| 4,361,694 | 11/1982 | Weinberg et al. | 528/279 |
| 4,397,977 | 8/1983 | Sandler | 524/288 |
| 4,471,108 | 9/1984 | Belder et al. | 528/272 |
| 4,482,700 | 11/1984 | Kühnrich et al. | 528/279 |
| 4,540,771 | 9/1985 | Ambrose et al. | 528/272 |
| 4,604,453 | 8/1986 | Kuze et al. | 528/481 |
| 4,762,861 | 8/1988 | Bohen et al. | 521/97 |
| 4,912,158 | 3/1990 | Bohen et al. | 524/288 |
| 4,923,917 | 5/1990 | Bohen | 524/288 |
| 4,938,894 | 7/1990 | Bohen et al. | 252/609 |
| 4,954,542 | 9/1990 | Bohen et al. | 524/89 |
| 4,970,288 | 11/1990 | Larkin et al. | 528/272 |
| 4,973,655 | 11/1990 | Pipper et al. | 528/272 |
| 5,013,777 | 5/1991 | MacLeay et al. | 524/159 |
| 5,043,374 | 8/1991 | Bohen et ql. | 524/288 |
| 5,049,697 | 9/1991 | Bohen et al. | 560/83 |
| 5,115,085 | 5/1992 | Sadlowski et al. | 528/272 |
| 5,143,984 | 9/1992 | Jenkins et al. | 525/437 |
| 5,162,405 | 11/1992 | MacLeay et al. | 524/91 |
| 5,166,310 | 11/1992 | Rooney | 528/283 |
| 5,208,366 | 5/1993 | Bohen et al. | 560/83 |
| 5,296,586 | 3/1994 | Burch et al. | 528/274 |
| 5,434,000 | 7/1995 | Konagaya et al. | 428/329 |
| 5,434,239 | 7/1995 | Bhatia | 528/274 |
| 5,434,294 | 7/1995 | Pugach et al. | 560/99 |
| 5,446,122 | 8/1995 | Warner et al. | 528/279 |
| 5,453,479 | 9/1995 | Borman et al. | 528/279 |
| 5,476,919 | 12/1995 | Schaeffer | 528/272 |

FOREIGN PATENT DOCUMENTS

| | | |
|---|---|---|
| 0332761 | 9/1989 | European Pat. Off. . |
| 0333987 | 9/1989 | European Pat. Off. . |
| 0363647 | 4/1990 | European Pat. Off. . |
| 56-8063 | 2/1981 | Japan . |
| 8701713 | 3/1987 | WIPO . |
| 8903854 | 5/1989 | WIPO . |

*Primary Examiner*—Samuel A. Acquah
*Attorney, Agent, or Firm*—E. E. Spielman, Jr.

[57] ABSTRACT

Unsaturated, thermosetting, brominated phthalic anhydride/polyol polyester resins are prepared by reacting brominated phthalic anhydride with polyol and an unsaturated polycarboxylic acid compound in the presence of an acid neutralizing agent under reaction conditions so as to form an unsaturated polyester resin product, the proportions of reactants being selected so as to provide, (i) at least about a 5:4 mole ratio of total moles of polyol to the sum of the moles of brominated phthalic anhydride, unsaturated polycarboxylic acid compound and any saturated polycarboxylic acid compounds in the reaction, and (ii) a bromine content of at least about 40 weight percent in the unsaturated polyester resin product.

16 Claims, No Drawings

PROCESS FOR MAKING UNSATURATED, THERMOSETTING, BROMINATED PHTHALIC ANHYDRIDE/POLYOL POLYESTER RESINS

This invention relates generally to the preparation of flame retardant polyester resins and, more particularly, to an improved process for making tetrabromophthalic anhydride/gyccol/maleic anhydride polyester resins.

Unsaturated, thermosetting polyester resins such as tetrabromophthalic anhydride/ethylene glycol/maleic anhydride resins are useful in forming flame retardant fiberglass structures. The resins, dissolved in a reactive cross linking diluent or diluents such as styrene, dibromostyrene, methylmethacrylate and divinyl benzene, and frequently in admixture with other resins to impart the desired properties to the finished product, can be cured to rigid, flame retardant, cross-linked structures by adding a curing agent such as an organic peroxide.

A problem associated with the preparation of the tetrabromophthalic anhydride-based polyeser resins is the presence of a large amount of low molecular weight material in the product. These materials constitute unpolymerized tetrabromophthalic anhydride and its derivatives. This low molecular weight material can separate as a solid from the product mixture by settling or during filtration. It can also be lost, due to its volatility, during high temperature processing or flame testing of the resin. The net results is that the resin is less flame retardant than would be expected from the use of a given amount of tetrabromophthalic anhydride starting material.

The source of the problem is believed to be the presence of small amounts (e.g. 0.05 to 1.0 wt. %) of sulfuric acid of $SO_3$ in the tetrabromophthalic anhydride. In order to achieve complete bromination of the phthalic anhydride, fuming sulfuric acid (oleum) is used and the product crystals contain trapped sulfuric acid and $SO_3$ which are released when the tetrabromophthalic anhydride is contacted with the liquid glycol during the preparation of the linear, polyester oligomers.

U.S. Pat. No. 3,285,995 teaches that neutralization of these acid impurities prevents the formation of polyol derived by-products, such as acetals and ethers, thereby avoiding unstable polyester formation which can solidify the entire polyester resin due to reactant imbalance.

Such neutralization, when attempting to make polyesters which have a bromine content of 40 wt % or more while maintaining reactant balance and preventing premature gelation, results in tetrabromphthalic anhydride polyesters containing large quantities of unpolymerized tetrbromophthalic derivatives.

It has now been found that the preparation of the low molecular weight by-product can be suppressed by the use of a significant molar excess of glycol to anhydride in the reaction.

In accordance with this invention there is provided a process for forming an unsaturated, brominated phthalic anhydride containing polyester resin comprising reacting brominated phthalic anhydride with polyol and an unsaturated polycarboxylic acid compound in the presence of an acid neutralizing agent under reaction conditions so as to form an unsaturated polyester resin product, the proportions of reactants being selected so as to provide, (i) at least about a 5:4 mole ratio of total moles of polyol to the sum of the moles of brominated phthalic anhydride, unsaturated polycarboxylic acid compound and any saturated polycarboxylic acid compounds in the reaction, and (ii) a bromine content of at least about 40 weight present in said unsaturated polyester resin product.

Also provided is the process for forming the polyester resin wherein the production of high molecular weight fractions is suppressed by mixing and reacting the brominated phthalic anhydride and the polyol at an elevated temperature (preferably 65°–165° C. and most preferably, 85°–155° C.) prior to the addition of the polycarboxylic acid compound to the reaction.

The preferred brominated phathlic anhydride for use in the process of the invention is the completely substituted aromatic bromine compound, tetrabromophthalic anhydride, Because of the use of fuming sulfuric acid in the bromination reaction in order to facilitate complete bromination, the tetrabromophthalic anhydride contains small amounts (usually from about 0.05 to 10 wt. %) of sulfuric acid and/or $SO_3$. As used herein, phthalic anhydride compounds which contain 1 to 4 bromines are included within the term "brominated phthalic anhydride". A tetrabromophthalic anhydride product is available from Albemarle Corportion (SAYTEX® RB-49 flame retardant). The brominated phthalic anhydrides are used in amounts so as to provide from about 40 to 60 weight percent bromine in the polyester resin.

The ability to prepared high bromine content resins which contain minimal amounts of low molecular weight tetrabromophthalate by-products is a significant advanced in the art because providing the amount of bromine needed for flame retardancy of blended resin compositions requires smaller amounts of the brominated resin. This not only is more economical but it gives less modification of the other properties of the original non-flame retarded resin.

The polyols which are useful in the process of the invention include glycols as well as polyols which contain 2 to 6 hydroxy groups. Non-limiting examples of glycols include ethylene glycol, 1,2-propylene glycol, 1,3-propane diol, diethylene glycol, dipropylene glycol, triethylene glycol, neopentyl, glycol, dibromoneopentyl glycol 1,4-butene diol, 1,4-butyne diol, 1,4-butane diol, 1,5-pentane diol, cyclohexane dimethanol, 2,3-dibromobutene diol, 1,6-hexane glycol, polyethylene glycol, and polypropylene glycol. Mixtures of any two or more of the glycols can be used. Non-limiting examples of higher polyols include trimethylol ethane, trimethylol propane, glycerol, 1,2,6-hexanetriol, pentaerythritol, sorbitol, methyl glycoside and mannitol. Mixtures of any two or more of the higher polyols including mixtures with the glycols can be used.

The unsaturated polycarboxylic acid compounds useful in the production of the polyesters to impart cross-linking, thermoset properties to the resins include both the free acids and anhydrides. Accordingly, as used in this application the terms "polycarboxylic acid compound(s)" and "dicarboxylic acid compound(s)" include anhydrides as well as the free acid. Preferred compounds are dicarboxylic acid compounds. Non-limiting examples of such compounds include maleic acid, fumaric acid, maleic anhydride, hemic (norbornene) anhydride, tetrahydrophthalic anhydride, tetrachlorophthalic anhydride and the like.

The reaction mixture can also include saturated polycarboxylic acid compounds such as phthalic anhydride, adipic acid, succinic acid, succinic anhydride, glutaric anhydride, phthalic acid, isophthalic acid, terephthalic acid, oxalic acid, azelaic acid, malic acid, glutaric acid and the like.

The relative proportions of brominated phthalic anhydride and the other reactants are chosen to provide a bromine content of at least about 40 and, preferably, from about 40 to 60 weight percent bromine in the linear, polyester oligomer products. For example, using about a 1:1:2.5 mole ratio of tetrabromophthalic anhydride to maleic anhydride to ethylene glycol will provide a polyester product which contains about 45 weight percent bromine.

Neutralizing agents include inorganic and organic salts or bases. Non-limiting examples include sodium acetate, sodium hydroxide, disodium tetrabromophthalate, diethylamine, urea, dilute ammonium hydroxide, diethanolamine, triethylene diamine, triethanolamine and the like. The use of neutralizing agents which are volatile at reaction temperatures, such as triethylene diamine, has the added advantage of coating the reactor surfaces with the agent which will then react with any $SO_3$ which is released into the reactor headspace. This helps avoid corrosion of stainless steel reactors by acid formed from the $SO_3$ and water. Alternatively, small amounts of water can be added to the reactor so as to convert the $SO_3$ to sulfuric acid so that it will remain in the reaction mixture until it can be neutralized.

The neutralizing reagents are used in amounts which are at least sufficient to react with all of the acid and acid generating impurities in the brominated phthalic anhydride. A suitable amount of neutralizing agent to add in any given case can be readily determined. For example, amounts of from about 0.1 to 1.5 weight percent are usually sufficient to neutralize all of the acid and acid generating species in the brominated phthalic anhydride.

Optionally, esterification catalysts which do not significantly increase the amount of low molecular weight by-products can be used to speed up the reaction. Suitable catalysts include metal containing esterification catalyst compositions which are known in the art and are commercially available. Preferred catalysts are organic and inorganic antimony and tin compounds such as oxides, alkoxides and carboxylates of these metals. Non-limiting examples of tin catalysts are disclosed, for example, in U.S. Pat. No. 4,970,288, whose entire contents are incorporated by reference herein, and include hydroxybutyltin oxide, monobutyltin tris(2-ethylhexanoate) and dibutyltin oxide. Analogous antimony compounds can be used. A preferred antimony catalyst is $Sb_2O_3$. The catalysts are used in catalytic amounts of, for example, from about 0.01 to 1.0 wt. % of the total weight of acid (i.e., free acid and anhydride) and polyol reactants.

The neutralizing agent should be present before the brominated phthalic anhydride is reacted with the polyol and the neutralizing agent and any catalyst are usually added to the liquid polyol in the reactor prior to the addition of the brominated phthalic anhydride.

The temperature of the reaction mass when the brominated phthalic anhydride is added (i.e., the "addition temperature") is not critical when using the process of the invention. In fact, the brominated phthalic anhydride reactant is preferably added at elevated temperatures which both facilitates the mixing of a relatively large volume of solid bromophthalic anhydride with a small volume of liquid polyol and shortens reaction time. Addition temperatures range from ambient temperature to about 200° C. Preferred addition temperatures range from about 50° to 190° C. and most preferred from 180°–190° C. Preferred reaction temperatures after all of the reactants have been added range from about 155° C. up to a temperature below where any substantial acid decarboxylation occurs (i.e., 200° C.-250° C. C). Most preferred reaction temperatures range from about 180° C. to 190° C.

Although any order of mixing of the reactants can be followed, it has been discovered that if the tetrabromophthalic anhydride is made to react with the glycol at an elevated temperature prior to the addition of the maleic anhydride, then the production of very high molecular components which result from the reaction of maleic anhydride and glycol is usually suppressed. Preferably, this reaction temperature is at least about 150° C. This result is advantageous because products which do not contain these higher molecular weight fractions require less reactive diluent to completely dissolve them. Because higher bromine content solutions can be made, a smaller volume of solution is needed to provide the required flame retardancy to the final resin blend. The ability to use a smaller amount of the volatile diluents is also desirable from an environmental standpoint.

Although molar ratios of polyol to total carboxylic acid and anhydride reactants of at least about 5:4 are sufficient to obtain a linear polyester oligomer product which does not contain significant amounts of low molecular weight tetrabromophthalic anhydride containing by-products, a greater excess of polyol can be used to facilitate mixing during the reaction and to account for any losses of polyol due to its being carried out of the reaction along with the water (e.g., ratios of 7:4 or higher). The use of larger amounts of polyol will, however, tend to reduce the average chain length of the oligomers and, therefore, the average molecular weight of the polyester product. Also, the use of ratios in excess of about 5:4 may require stripping to increase and optimize flame retardancy because the polyols are flammable.

Analysis of the low molecular weight by-product in the polyester products by mass spec. analysis indicates that it is some unreacted tetrabromophthalic anhydride and also probably comprises cyclic esters formed by the reaction of both acid groups of one molecule of the tetrabromophthalic anhydride with two hydroxyl groups of a single molecule of the polyol. This latter reaction is believed to be catalyzed by the acid impurities from the bromophthalic anhydride. The cyclic ester is, apparently, unreactive under normal reaction conditions such that it is carried into the final product. Although the mechanism is not known, the use of excess polyol minimizes the amount of the cyclic ester in the product when producing high bromine content resins.

The invention is further illustrated by, but is not intended to be limited to, the following examples.

EXAMPLE 1

A 1 liter glass resin kettle having a four-neck glass top was equipped with a nitrogen purge, a mechanical stirrer, a thermocouple, a heating mantle, and a punch column which was connected to a condenser and graduated cylinder for collecting and measuring the water produced. To this reactor at room temperature were added ethylene glycol (247.73 gms, 3.99 moles), diethylene glycol (132.70 gms, 1.25 moles), and sodium acetate (1.58 gms, 0.0193 mole). The mixture was stirred at 250 rpm and heated to 110° C. $Sb_2O_3$ catalyst (1.50 gms, 0.00515 mole) was added at 70° C. and maleic anhydride (196.12 gms, 2.0 moles) was added at 110° C. The stirring rate was increased to 400 rpm. The reaction temperature was increased to 182° C. during about 30 minutes and 3 mls of water were collected. After 15 minutes, tetrabromophthalic anhydride (TBPA) (927.4 gms, 2.0 moles, 0.080 wt. % sulfate) was added during 3 minutes at 186° C. The reaction temperature dropped to 158° C. and then was returned to 184° C.-187° C. for the remainder of the reaction. An hour after adding the TBPA, the nitrogen purge was raised and the stirring rate was increased to 500 rpm. The reaction was continued for a total of 3 hours after the TBPA addition and a total of 73 mls of water were collected (101.4% of theory). The mole ratio of total anhydride to glycol reactants was 4:5.24. The final acid number of the product was 12.4. The polyester oligomer product, which had a bromine content of about 45 weight percent, was analyzed by GPC (gel permeation chromatography, also referred to as size exclusion chromatography) in THF with the following results:

| Peak | Retention time (min) | Area % | Mol Wt* |
|---|---|---|---|
| 1 | 11.24 | 8.8 | 5110 |
| 2 | 12.43 | 54.2 | 2150 |
| 3 | 13.53 | 8.9 | 970 |
| 4 | 14.13 | 7.6 | 620 |
| 5 | 14.78 | 8.5 | 390 |
| 6 | 15.77 | 6.6 | 190 |
| 7 | 16.90 | 5.1 | 80 |
| 8 | 17.45 | 0.4 | 60 |

*Mol Wt at peak max, polystyrene standard

According to mass spec. analysis, the low molecular weight material having a retention time of about 16.90 and 17.45 minutes (peaks 7 and 8) is believed to comprise mostly cyclic esters of TBPA and glycol and totaled about 5.5 area percent. Because a polystyrene standard was used, the actual molecular weights are believed to be from about 3–5 times the reported values.

EXAMPLE 2

The process of Example 1 was repeated using three times the amount of $Sb_2O_3$ catalyst (4.5 gms, 0.01544 mole) and the amount of sodium acetate was 1.58 grams. The amount of ethylene glycol was 248.30 gms, the amount of diethylene glycol was 136.50 gms, the amount of maleic anhydride was 196.12 gms and the amount of TBPA was 927.4 gms. The mole ratio of anhydride to glycol was 4:5.29. The ethylene glycol, diethylene glycol, sodium acetate and $Sb_2O_3$ were added to the reactor at room temperature with stirring at 250 rpm. The reactor was heated and after 20 minutes the maleic anhydride was added at 110° C. The stirring rate was increased to 400 rpm and the temperature was then raised to 185° C. during about 35 minutes. Water began condensing in the overhead at 155° C. and began distilling over at 168° C. When the temperature reached 185° C., the TBPA was added during 5 minutes and the temperature dropped to 159° C. The temperature was returned to 186° C. and remained at 186° C.–189° C. for the remainder of the reaction. After 3 hours reaction, a total of 72 mls of water were collected (100% of theory). The nitrogen purge was increased 25 minutes after TBPA addition and the stirring rate was increased to 500 rpm 40 minutes after the TBPA was added. The acid number of the final product was 11.3. GPC analysis according to the description in Example 1 gave the following results:

| Peak | Retention time (min) | Area % | Mol Wt |
|---|---|---|---|
| 1 | 11.16 | 7.6 | 5120 |
| 2 | 12.40 | 56.4 | 2200 |
| 3 | 13.54 | 8.3 | 960 |
| 4 | 14.11 | 7.9 | 630 |
| 5 | 14.77 | 8.8 | 390 |
| 6 | 15.76 | 6.6 | 190 |
| 7 | 16.90 | 4 | 80 |
| 8 | 17.44 | 0.4 | 60 |

It can be seen that the low molecular weight material (less than 100) totaled about 4.4 area percent.

EXAMPLE 3

Using a reactor setup as described in Example 1, a TBPA, glycol, maleic anhydride product was prepared using a mole ratio of anhydride to glycol of 4:5.23, a hydroxybutyltin oxide catalyst and diethanolamine (DEA) as neutralizing agent. TBPA (1.937 moles), ethylene glycol (3.377 moles), diethylene glycol (1.69 moles), hydroxy-butyltin oxide (1.49 gms), and DEA (4.41 gms) were added to the reaction at room temperature and stirred at 400 rpm. When the temperature reached 85° C., 1.937 moles of maleic; anhydride were added and the temperature was raised to 185° C. to 190° C. The reaction time was about 3 hours with 62.5 mls of water collected (86.8% of theory). The product acid number was 18.8. GPC analysis as described in Example 1 gave the following results:

| Peak | Retention Time (min) | Area % | Mol Wt |
|---|---|---|---|
| 1 | 12.27 | 58.1 | 2200 |
| 2 | 13.42 | 6.9 | 960 |
| 3 | 13.95 | 7.0 | 650 |
| 4 | 14.59 | 8.8 | 410 |
| 5 | 15.62 | 6.6 | 200 |
| 6 | 16.75 | 12.6 | 90 |

As a comparison to Example 3, a reaction was run using only 2.717 moles of ethylene glycol and 1.359 moles of diethylene glycol so as to give a 1:1.05 anhydride to glycol mole ratio. Also included were 4.94 gms of DEA neutralizing agent and 1.40 gms of hydroxy-butyltin oxide catalyst. The lot of TBPA used contained 0.130% sulfate. After a reaction time of 2.5 hours, 42 mls of water (58.3% of theory) were collected. The acid number of the product was 32.6 after 3 hours reaction time. The GPC analysis results were as follows:

| Peak | Retention Time (min) | Area % | Mol Wt |
|---|---|---|---|
| 1 | 10.78 | 20.8 | 6310 |
| 2 | 11.56 | 39.3 | 3600 |
| 3 | 14.68 | 3.5 | 380 |
| 4 | 15.94 | 3.3 | 160 |
| 5 | 16.74 | 33.1 | 90 |

It can be seen from the GPC results that using only a 1:1.05 ratio of anhydride to glycol produced 33.1 area percent of low molecular weight cyclic ester compound compared with 12.6 area percent in Example 3.

EXAMPLE 4

Using a reactor setup as described in Example 1, a TBPA, glycol, maleic anhydride polyester product was prepared using a mole ratio of anhydride to glycol of 4:5.19, a hydroxybutyltin oxide catalyst and sodium acetate as neutralizing agent. Ethylene glycole (244.4, 3.94 moles), diethylene glycol (132.65, 1.25 moles), sodium acetate ( 1.58 gms) and hydroxybutyltin oxide catalyst (1.50 gms) were added to the reactor at room temperature and stirred at 400 rpm. When the temperature reached 104° C., 2 moles of maleic anhydride were added followed by 2 moles of TBPA at 185° C. and the stirring rate was increased to 550 rpm. The temperature dropped to about 160° C. due to the addition and then returned to 185° C. after a few minutes. The reaction temperature ranged from 185° C.–190° C. with a total reaction time after TBPA addition of 3.5 hours. The punch column was removed after about two hours. The stirring rate was increased to 600 rpm and the nitrogen purge was also increased after about 2½ hours. During the reaction, 63 mls of water (87.5% of theory) were collected. The acid number after 3.5 hours was 11.3. GPC analysis of the linear polyester oligomer product gave the following results:

| Peak | Retention Time (min) | Area % | Mol Wt |
|---|---|---|---|
| 1 | 10.94 | 21.9 | 6160 |
| 2 | 12.10 | 51.3 | 2670 |
| 3 | 13.99 | 7.2 | 680 |
| 4 | 14.73 | 7.4 | 400 |
| 5 | 15.76 | 4.0 | 190 |
| 6 | 16.88 | 7.1 | 85 |
| 7 | 17.54 | 1.1 | 50 |

The total low molecular product was about 8.2 area percent.

Comparison 2

As a comparison to Example 4, a reaction was run using only 3 moles of ethylene glycol and 1.05 moles of diethylene glycol so as to give a 1:1.0125 anhydride to glycol ratio. Also included were 1.58 gms of sodium acetate and 1.42 gms of hydroxybutyltin catalyst. The maleic anhydride addition was made at 85° C. After a reaction time of 4.0 hours following TBPA addition, 48 mls of water had been collected (66.7% of theory). The acid number of the product was 36.8. The GPC analysis results were as follows:

| Peak | Retention Time (min | Area % | Mol Wt |
|---|---|---|---|
| 1 | 10.94 | 15.4 | 6160 |
| 2 | 11.99 | 31.6 | 2890 |
| 3 | 14.14 | 3.4 | 610 |
| 4 | 14.81 | 3.6 | 380 |
| 5 | 16.01 | 3.6 | 160 |
| 6 | 16.86 | 42.5 | 90 |

It can be seen from the GPC results that using a 1:1.0125 ratio of anhydride to glycol and adding the TBPA at elevated temperature produced 42.5 area percent of by-product cyclic ester compound compared to 8.2 area percent in Example 4.

Comparison 3

As a further comparison, a reaction was run in a 1 liter stainless steel reactor kettle with a four-neck glass top equipped as in Example 1. The same proportions of reactants as in Example 1 were used, but without any catalyst or neutralizing agent. This reaction gave a product which contained a large amount (about 58 area %) of low molecular weight products. The reaction time was 2 hours. The maleic anhydride was added at 110° C and the TBPA at 185° C. The amount of water collected was 74.5 ml (103.5% of theory) after 2 hours reaction time. The acid number of the product was 51.4. The GPC analysis results were as follows:

| Peak | Retention Time (min) | Area % | Mol Wt |
|---|---|---|---|
| 1 | 10.56 | 6.3 | 8480 |
| 2 | 10.77 | 10.6 | 7280 |
| 3 | 11.41 | 25.3 | 4560 |
| 4 | 16.77 | 35.6 | 90 |
| 5 | 16.96 | 22.2 | 80 |

EXAMPLE 5

A stainless steel reactor setup as described in Comparison 3 was used to prepare a TBPA, glycol, maleic anhydride product. Ethylene glycol (237.79 gms, 3.83 moles), diethylene glycol (132.92 gms, 1.25 moles), sodium acetate (0.79 gm), $Sb_2O_3$ (1.5 gms) and triethylene diamine (0.541 gm) were added to the reactor and the mixture was heated to 185° C. over a period of one hour with stirring at 400 rpm. TBPA (927.4 gms, 2.0 moles) was then added and the temperature dropped to about 148° C. at which time the maleic anhydride (196.12 gms, 2.0 moles) was added. After a few minutes the temperature returned to 185° C. About 1 hour after TBPA addition the stirring rate was increased to 500 rpm and the nitrogen purge was also increased. After another hour, the stirring rate was increased to 550 rpm. The temperature range during the reaction was from 184° to 188° C. Three hours after TBPA addition 73 mls of water had been collected (101.3% of theory). The acid number of the product was 13.72. GPC analysis of the product gave the following results:

| Peak | Retention Time (min) | Area % | Mol Wt |
|---|---|---|---|
| 1 | 12.36 | 64.6 | 2170 |
| 2 | 13.52 | 7.7 | 930 |
| 3 | 14.09 | 7.9 | 610 |
| 4 | 14.74 | 8.0 | 380 |
| 5 | 15.72 | 6.9 | 190 |
| 6 | 16.85 | 5.0 | 80 |

The results indicate that not only was a low by-product (5.0 area percent) product produced but, due to the high temperature late addition (after the TBPA), of the maleic anhydride, it did not contain any high (3000 or above) molecular weight fraction.

Comparison 4

A glass reactor setup as described in Example 1 was used. The proportions of reactants were chosen to provide only a 4:4.61 total acid to glycol ratio. Water was initially added to convert any $SO_3$ which was released from the TBPA into the non-volatile sulfate so that it would stay in the reaction mixture and be neutralized rather than escaping into the reactor headspace. To the reactor were added ethylene glycol (214.83 gms, 3.46 moles), diethylene glycol (122.22 gms, 1.15 moles), sodium acetate (0.79 gm), $Sb_2O_3$ (1.5 gm) triethylene diamine (0.541 gm) and water 2.0 gms. A fluorescent light was used to illuminate the reaction mixture to determine if light might reduce the production of the low molecular weight material. The mixture, stirred at 400 rpm, was heated to 185° C. and TBPA (927.40 gms, 2.0 moles) was added followed in 5 minutes by the maleic anhydride, at which time the temperature had dropped to 153° C. The temperature was returned to 188° C. and held between 184°–190° C. for three hours following the TBPA addition. The stirring rate was increased to 500 rpm after about 1 hour and to 550 rpm after about 2 hours. The nitrogen purge was also increased at the same times. A total of 70.5 mls of water were collected (95.1% of theory). GPC analysis of the product gave the following results:

| Peak | Retention Time (min) | Area % | Mol Wt |
|---|---|---|---|
| 1 | 10.39 | 3.1 | 8860 |
| 2 | 11.21 | 13.3 | 4860 |
| 3 | 11.92 | 53.5 | 2910 |
| 4 | 13.50 | 5.7 | 920 |
| 5 | 14.01 | 5.3 | 640 |
| 6 | 14.70 | 5.4 | 390 |

-continued

| Peak | Retention Time (min) | Area % | Mol Wt |
|---|---|---|---|
| 7 | 15.69 | 4.1 | 190 |
| 8 | 16.80 | 9.7 | 80 |

It can be seen that lowering the amount of excess glycol below a 4:5 anhydride to glycol ratio gave a product which contained about 10 area percent of low molecular weight products as well as two very high molecular weight fractions.

EXAMPLE 6

Using the same reactor setup as in Comparison 4, a similar process was run except that 3.83 moles of ethylene glycol and 1.25 moles of diethylene glycol were used such that the anhydride to glycol ratio was 4:5.08. The amounts of the other ingredients were the same. The product contained only a small amount of low molecular weight by-product (1.7 area percent) with no high molecular weight fractions. A total of 75 mls of water were collected (104.2 % of theory). The GPC analysis results were as follows:

| Peak | Retention Time (min) | Area % | Mol Wt |
|---|---|---|---|
| 1 | 12.31 | 61.0 | 2190 |
| 2 | 13.20 | 8.1 | 1150 |
| 3 | 13.56 | 7.1 | 880 |
| 4 | 14.05 | 7.5 | 620 |
| 5 | 14.70 | 8.1 | 390 |
| 6 | 15.68 | 6.4 | 190 |
| 7 | 16.99 | 1.7 | 70 |

EXAMPLE 7

A resin was prepared using the same reactor setup with light as in Comparison 4 and Example 6, but without using any metal catalyst. The reaction used 2.0 moles of both TBPA and maleic anhydride, 3.85 moles of ethylene glycol and 1.25 moles of diethylene glycol so as to provide a 4:5.10 glycol to anhydride ratio. The reaction included 1.58 gm of sodium acetate and 2 mls of added water. The initial stirring rate was 400 rpm. The TBPA was added at 185° C. followed by maleic anhydride at 154° C. The temperature range was 181° to 187° C. with the nitrogen purge being increased at 30 minutes after TBPA addition. The stirring rate was increased to 500 rpm 1 hour and to 550 rpm 2 hours after the addition. After 3 hours, 79 mls of water had been collected (109% of theory). The GPC analysis results were as follows:

| Peak | Retention Time (min) | Area % | Mol Wt |
|---|---|---|---|
| 1 | 12.39 | 63.4 | 2100 |
| 2 | 13.48 | 8.8 | 950 |
| 3 | 14.06 | 7.5 | 620 |
| 4 | 14.71 | 7.5 | 390 |
| 5 | 15.70 | 7.5 | 190 |
| 6 | 16.82 | 5.3 | 80 |

EXAMPLE 8

The process according to Example 7 was repeated without the light. The other parameters of reactant quantities, time, temperatures, etc., were about the same and no catalyst was added. The amount of water collected was 73 mls (101.4% of theory). The GPC analysis results were very similar to that of Example 7 and were as follows:

| Peak | Retention Time (min) | Area % | Mol Wt |
|---|---|---|---|
| 1 | 12.63 | 59.9 | 1779 |
| 2 | 13.50 | 8.9 | 941 |
| 3 | 14.07 | 8.8 | 619 |
| 4 | 14.69 | 9.1 | 393 |
| 5 | 15.69 | 8.8 | 189 |
| 6 | 16.81 | 4.6 | 83 |

The above examples and comparisons illustrate that by using excess polyol (a mole ratio of at least about 5:4, i.e., 1.25 moles of polyol per mole of diacid and/or anhydride), the amount of low molecular weight, bromine containing by-products are minimized (only about 2–5 area percent) during the production of high bromine content (40 weight percent or more) products, even when the TBPA is added at elevated temperatures. Therefore, high bromine content unsaturated, thermosetting, brominated phthalic anhydride/polyester resins of high quality are economically prepared by the process of the invention.

What is claimed is:

1. A process for forming an unsaturated, brominated phthalic anhydride containing polyester resin, said process comprising reacting brominated phthalic anhydride with polyol and an unsaturated polycarboxylic acid compound in the presence of an acid neutralizing agent under reaction conditions so as to form an unsaturated polyester resin product, the proportions of reactants being selected so as to provide, (i) at least about a 5:4 mole ratio of total moles of polyol to the sum of the moles of brominated phthalic anhydride, unsaturated polycarboxylic acid compound and any saturated polycarboxylic acid compounds in the reaction, and (ii) a bromine content of at least about 40 weight percent in said unsaturated polyester resin product.

2. The process according to claim 1 wherein said mole ratio of total moles of polyol to the sum of the moles of brominated phthalic anhydride, unsaturated polycarboxylic acid compound and any saturated polycarboxylic acid compounds ranges from about 5:4 to about 7:4.

3. The process according to claim 1 wherein said polyol includes one or more glycols.

4. The process according to claim 3 wherein said polyol includes ethylene glycol.

5. The process according to claim 1 wherein the process includes a metal containing esterification catalyst composition.

6. The process according to claim 5 wherein said esterification catalyst composition includes one or more oxides, alkoxides or carboxylates of a metal selected from the group consisting of antimony and tin.

7. The process according to claim 5 wherein said esterification catalyst composition is present in an amount of from about 0.01 to 1.0 weight percent based on the total weight of reactants.

8. The process according to claim 1 wherein said neutralizing agent is sodium acetate.

9. The process according to claim 1 wherein said neutralizing agent is an amine.

10. The process according to claim 1 wherein said unsaturated polycarboxylic acid compound is a dicarboxylic acid or anhydride.

11. The process according to claim 1 wherein said unsaturated polycarboxylic acid compound is maleic anhydride.

12. The process according to claim 1 wherein said brominated phthalic anhydride is tetrabromophthalic anhydride which contains from about 0.05 to 1.0 weight percent of sulfuric acid and/or $SO_3$ impurities, the amount of acid neutralizing agent present is at least sufficient to neutralize said impurities, and said tetrabromophthalic anhydride is added to the reaction at a temperature of from ambient to about 200° C.

13. The process according to claim 12 wherein the addition temperature is from about 180° C. to 200° C.

14. The process according to claim 1 wherein an amount of neutralizing agent which is at least sufficient to neutralize the acid and/or acid producing species entrapped in the brominated phthalic anhydride is present.

15. The process according to claim 1 wherein the brominated phthalic anhydride is reacted with said polyol at an elevated temperature prior to adding the unsaturated polycarboxylic acid compound to the reaction.

16. The process according to claim 1 wherein a neutralizing agent is present which is volatile at reaction temperatures such that it will react with any acid impurities which are released into the headspace of the reactor.

\* \* \* \* \*